US009760514B1

(12) United States Patent
Hanscom et al.

(10) Patent No.: US 9,760,514 B1
(45) Date of Patent: Sep. 12, 2017

(54) MULTI-PACKET PROCESSING WITH ORDERING RULE ENFORCEMENT

(71) Applicant: International Business Machines Corporation, Armonk, NY (US)

(72) Inventors: Jeffrey C. Hanscom, Poughkeepsie, NY (US); Eric N. Lais, Georgetown, TX (US); John M. Pritz, Mercer Island, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/275,529

(22) Filed: Sep. 26, 2016

(51) Int. Cl.
| | | |
|---|---|---|
| *G06F 13/36* | (2006.01) | |
| *H04L 12/801* | (2013.01) | |
| *G06F 13/40* | (2006.01) | |
| *G06F 13/42* | (2006.01) | |
| *H04L 29/08* | (2006.01) | |

(52) U.S. Cl.
CPC .......... *G06F 13/36* (2013.01); *G06F 13/4068* (2013.01); *G06F 13/4282* (2013.01); *H04L 47/34* (2013.01); *G06F 2213/0026* (2013.01); *H04L 69/324* (2013.01)

(58) Field of Classification Search
CPC .. G06F 13/36; G06F 13/4068; G06F 13/4282; H04L 47/34
USPC ............... 710/39, 43, 52, 54, 305, 310, 313; 370/476
See application file for complete search history.

(56) References Cited

U.S. PATENT DOCUMENTS

| | | | |
|---|---|---|---|
| 6,950,886 B1 | 9/2005 | Bailey | |
| 9,442,855 B2 * | 9/2016 | Ajanovic | ............... G06F 1/3203 |
| 9,467,307 B2 * | 10/2016 | Divivier | .............. H04L 12/5693 |
| 2005/0259651 A1 * | 11/2005 | Yashima | ............. G06F 13/4226 370/389 |
| 2007/0130372 A1 * | 6/2007 | Irish | ........................ G06F 13/12 710/5 |

(Continued)

FOREIGN PATENT DOCUMENTS

WO          0118988          3/2001

OTHER PUBLICATIONS

Definition of PCI Express from Wikipedia, <https://en.wikipedia.org/wiki/PCI_Express>, accessed on Feb. 2, 2017.*

(Continued)

*Primary Examiner* — Nimesh G Patel
(74) *Attorney, Agent, or Firm* — Cantor Colburn LLP; Maeve Carpenter

(57) ABSTRACT

A system includes an input/output adapter operable to receive a plurality of packets in a single clock cycle. The system includes a controller operatively connected to the input/output adapter. The controller is operable to receive a first packet at a data link layer and determine a state of a first output indicator to maintain packet ordering. Based on determining that a first receiver formatting interface is selected by the first output indicator, the controller performs an alignment adjustment and output of the first packet by the first receiver formatting interface. Based on determining that a second receiver formatting interface is selected by the first output indicator, the controller performs the alignment adjustment and output of the first packet by the second receiver formatting interface.

20 Claims, 7 Drawing Sheets

(56) References Cited

U.S. PATENT DOCUMENTS

| | | | | |
|---|---|---|---|---|
| 2007/0180155 | A1* | 8/2007 | Irish | G06F 13/4045 710/5 |
| 2009/0003335 | A1 | 1/2009 | Biran et al. | |
| 2009/0257451 | A1* | 10/2009 | Saghi | G06F 13/385 370/476 |
| 2011/0072172 | A1* | 3/2011 | Rodrigues | G06F 13/385 710/52 |
| 2015/0039804 | A1* | 2/2015 | Volkening | G06F 13/28 710/308 |
| 2016/0179730 | A1* | 6/2016 | Halleck | G06F 13/4282 710/105 |
| 2016/0350250 | A1* | 12/2016 | Vasudevan | G06F 13/4282 |

OTHER PUBLICATIONS

List of IBM Patents or Patent Applications Treated as Related, Oct. 20, 2016, 2 pages.

U.S. Appl. No. 15/276,911, filed Sep. 27, 2016, Entitled: Cut-Through Buffer With Variable Frequencies, First Named Inventor: Jeffrey C. Hansom.

U.S. Appl. No. 15/272,858, filed Sep. 22, 2016, Entitled: Multi-Source Data Insertion Using an Elastic FIFO, First Named Inventor: Jeffrey C. Hansom.

U.S. Appl. No. 15/272,974, filed Sep. 22, 2016, Entitled: Processing of Inbound Back-To-Back Completions in a Communication System, First Named Inventor: Jeffrey C. Hansom.

U.S. Appl. No. 15/275,531, filed Sep. 26, 2016, Entitled: Simultaneous Inbound Multi-Packet Processing, First Named Inventor: Jeffrey C. Hansom.

List of IBM Patents or Patent Applications Treated as Related, May 30, 2017, 2 pages.

U.S. Appl. No. 15/594,784, filed May 15, 2017, Entitled: Multi-Packet Processing With Ordering Rule Enforcement, First Named Inventor: Jeffrey C. Hansom.

* cited by examiner

MULTI-PACKET PROCESSING WITH ORDERING RULE ENFORCEMENT

BACKGROUND

Aspects are related generally to computer-based communication systems, and more specifically to multi-packet processing with enforcement of ordering rules in a computer system.

Peripheral component interconnect express (PCIe) is a component level interconnect standard that defines a bi-directional communication protocol for transactions between input/output (I/O) adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus.

A high-bandwidth PCIe link (x16) can transmit two full transaction layer packets (TLPs) in a single scaled clock cycle and must process two TLPs in the order received. A PCIe device must perform TLP assembly, decoding, and routing of inbound TLPs. TLPs are typically received in double word (4 byte) multiples which must be assembled to determine how to process them as headers and data payloads of various lengths. TLPs must be processed in the order that they are transmitted. In some PCIe instances, the bandwidth is high enough to cause two full PCIe TLPs to be received in a single cycle. TLPs must be processed without placing back-pressure (e.g., excessive delay) on the link at this rate, and thus, there is a need for a method to assemble and process the TLPs at this rate.

SUMMARY

According to one embodiment, a system includes an input/output adapter operable to receive a plurality of packets in a single clock cycle. The system further includes a controller operatively connected to the input/output adapter. The controller is operable to receive a first packet at a data link layer and determine a state of a first output indicator to maintain packet ordering. Based on determining that a first receiver formatting interface is selected by the first output indicator, the controller performs an alignment adjustment and output of the first packet by the first receiver formatting interface. Based on determining that a second receiver formatting interface is selected by the first output indicator, the controller performs the alignment adjustment and output of the first packet by the second receiver formatting interface.

According to an embodiment, a method includes receiving a first packet at a data link layer at an input/output adapter operatively connected to a controller. A state of a first output indicator to maintain packet ordering is determined. Based on determining that a first receiver formatting interface is selected by the first output indicator, performing an alignment adjustment and output of the first packet by the first receiver formatting interface. Based on determining that a second receiver formatting interface is selected by the first output indicator, performing the alignment adjustment and output of the first packet by the second receiver formatting interface.

According to an embodiment, a computer program product includes a computer readable storage medium having program instructions embodied therewith. The program instructions are executable by a processing circuit of a controller to cause the processing circuit to perform receiving a first packet at a data link layer at an input/output adapter operatively connected to the controller. A state of a first output indicator to maintain packet ordering is determined. Based on determining that a first receiver formatting interface is selected by the first output indicator, performing an alignment adjustment and output of the first packet by the first receiver formatting interface. Based on determining that a second receiver formatting interface is selected by the first output indicator, performing the alignment adjustment and output of the first packet by the second receiver formatting interface.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments provide inbound multi-packet processing in a computer system while enforcing ordering rules. Rather than processing each double word received individually in first-in-first-out (FIFO) order as a single pipeline with complicated decode, error checking, and buffer write logic, embodiments can process up to two packets per cycle and maintain ordering splits of incoming packets into two parallel pipelines. For example, each pipeline can receive 32 bytes of data and a 16 byte header with separate processing of each header per pipeline. Embodiments can perform pre-assembly of header and data payloads to simplify downstream processing logic.

Figure 1:
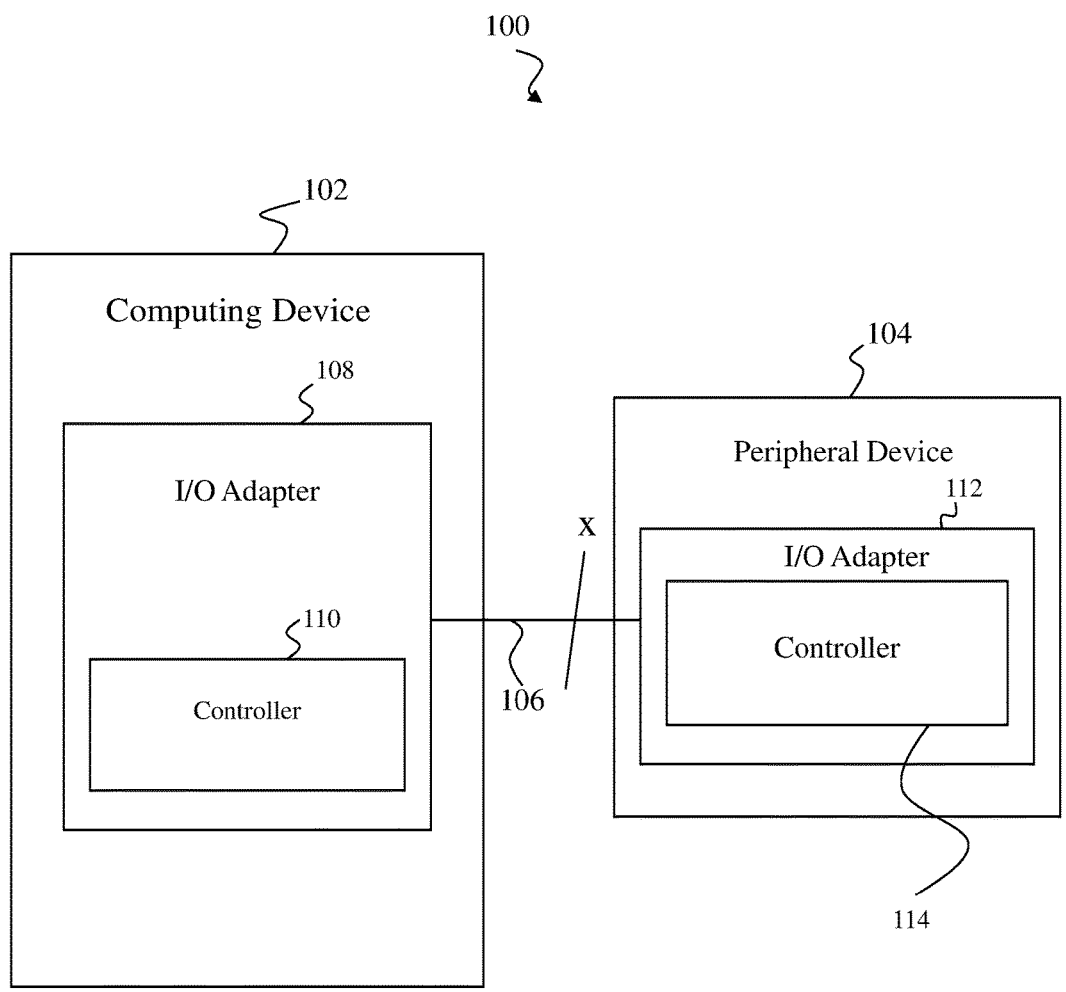
FIG. 1 illustrates a system in accordance with an embodiment.

FIG. 1 illustrates a system 100 on which embodiments may operate. The system 100 includes a computing device 102 and a peripheral device 104. The computing device 102 may be any type of computing device, such as, for example, a personal computer or a server. The computing device 102 performs operations and generates commands and data for transmission to the peripheral device 104. The computing device 102 may be referred to herein as a "root" or a "root complex". The peripheral device 104 may be any type of device capable of receiving commands and data from the computing device 102. For example, the peripheral device 104 may be a monitor, printer, memory unit, or the like.

The computing device 102 and the peripheral device 104 are coupled to one another by a communications link 106. In one embodiment, the communications link 106 may be a PCI Express link. As discussed, a PCI Express link (or bus) is built around pairs of serial (1-bit), unidirectional point-to-point connections also known as "lanes". The number of lanes can be variable and is indicated by the "x" related to the communications link 106.

In more detail, the computing device 102 may include an input/output (I/O) adapter 108 that allows for the physical connection to the communications link 106. The I/O adapter 108 may be operatively connected to a controller 110. In general, the controller 110 serves to control the operation of the I/O adapter 108. The controller 110 can be integrally formed or separate from the I/O adapter 108. In more detail, the controller 110 controls the creation, transmission, and reception of data packets transferred between the computing device 102 and the peripheral device 104 over the communications link 106. The controller 110 may also handle the creation and transmission of flow control credits and transaction layer packets, among other things. In embodiments, the I/O adapter 108 can be a PCIe adapter. The controller 110 may include one or more processing circuits that can be configured to execute processes as further described herein based on program instructions that establish configuration, layout, timing, and/or other functional characteristics of the controller 110 as parallel and/or sequential operations.

The peripheral device 104 may also include an I/O adapter 112 and a controller 114. The I/O adapter 112 may be operatively connected to the controller 114 of the peripheral device 104. In general, the controller 114 serves to control the operation of the I/O adapter 112. The controller 114 can be integrally formed or separate from the I/O adapter 112. In more detail, the controller 114 controls the creation, transmission, and reception of data packets transferred between the peripheral device 104 and the computing device 102 over the communications link 106. The controller 114 may also handle the creation and transmission of flow control credits and transaction layer packets, among other things. In embodiments, the I/O adapter 112 can be a PCIe adapter. The controller 114 may include one or more processing circuits that can be configured to execute processes as further described herein based on program instructions that establish configuration, layout, timing, and/or other functional characteristics of the controller 114 as parallel and/or sequential operations.

Figure 2:
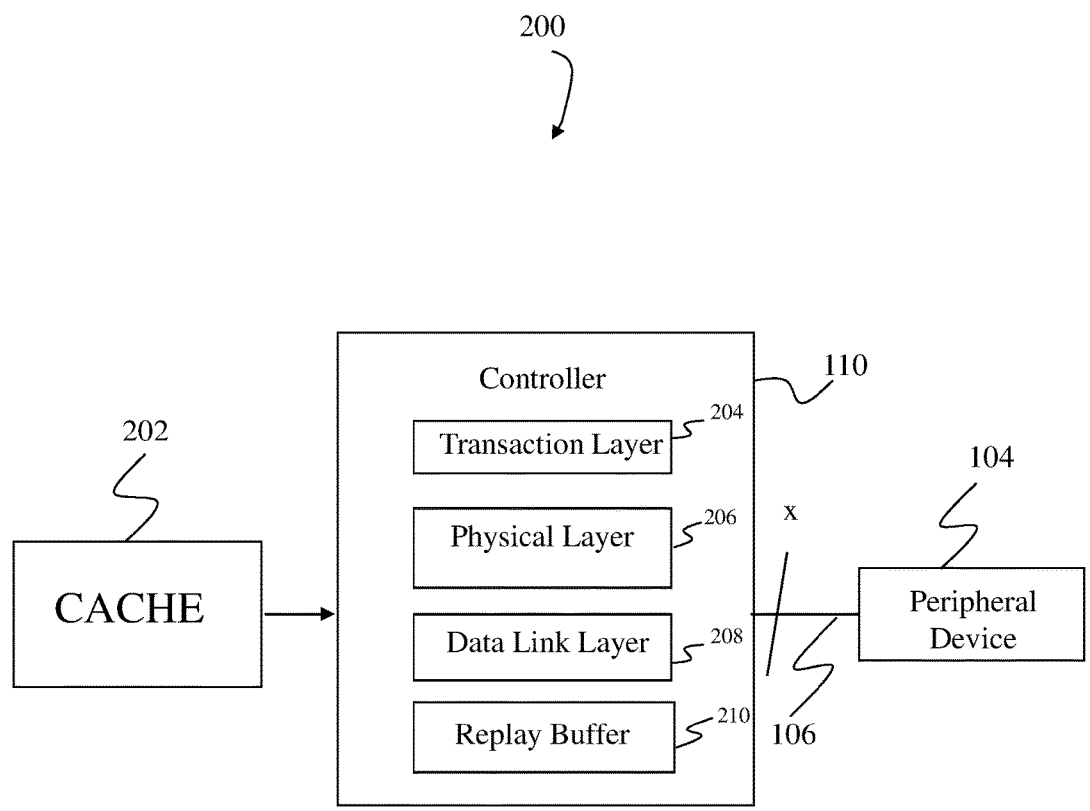
FIG. 2 illustrates a more detailed depiction of a portion of the system shown in FIG. 1 in accordance with an embodiment.

FIG. 2 depicts a block diagram of a portion of the system 100 shown in FIG. 1 in more detail as system 200. In particular, the system 200 includes a cache 202 coupled to controller 110. Information and commands to be transferred from the computing device 102 (FIG. 1) can be stored in the cache 202. The controller 110 handles the transmission of information to the peripheral device 104 via the communications link 106.

The controller 110 can implement, among other things, the PCI Express protocol. In addition, the controller 110 is configured to implement some or all of the aspects of embodiments.

The PCI Express protocol defines a transaction layer 204, a data link layer 208, and a physical layer 206. These layers 204-208 may also be present in the peripheral device 104. As shown, the controller 110 also includes a replay buffer 210. In general, the replay buffer 210 stores packets that have been sent by the controller 110 to the peripheral device 104 until the peripheral device 104 acknowledges receipt of the packets with a defined "ACK" indicator. In the event that a receipt is not acknowledged, one or more packets can be resent from the replay buffer 210.

The transaction layer 204 assembles packets of transaction requests, such as reads and writes, from the computing device 102 (FIG. 1). In common usage, these requests may be said to be received from the "core". Header information is added to the transaction requests, to produce transaction layer packets (TLPs). The data link layer 208 applies a data protection code, such as a cyclic redundancy check (CRC), and assigns a sequence number to each TLP. At the physical layer 206, the TLP is framed and converted to a serialized format, then is transmitted across the communications link 106 at a frequency and width compatible with the peripheral device 104.

At the peripheral device 104, the process is reversed. The physical layer converts the serialized data back into packet form, and stores the extracted TLP in memory at the data link layer. The data link layer verifies the integrity of the received TLP, such as by performing a CRC check of the packet, and also confirms the sequence number of the packet. After both checks are performed, the TLP, excluding the sequence number and the data link layer CRC, is forwarded to the transaction layer. The transaction layer disassembles the packet into information (e.g., read or write requests) that is deliverable to the device core. The transaction layer also detects unsupported TLPs and may perform its own data integrity check. If the packet transmission fails, the data link layer requests retransmission of the TLP from the replay buffer 210, known as a link layer retry (LLR).

Figure 3:
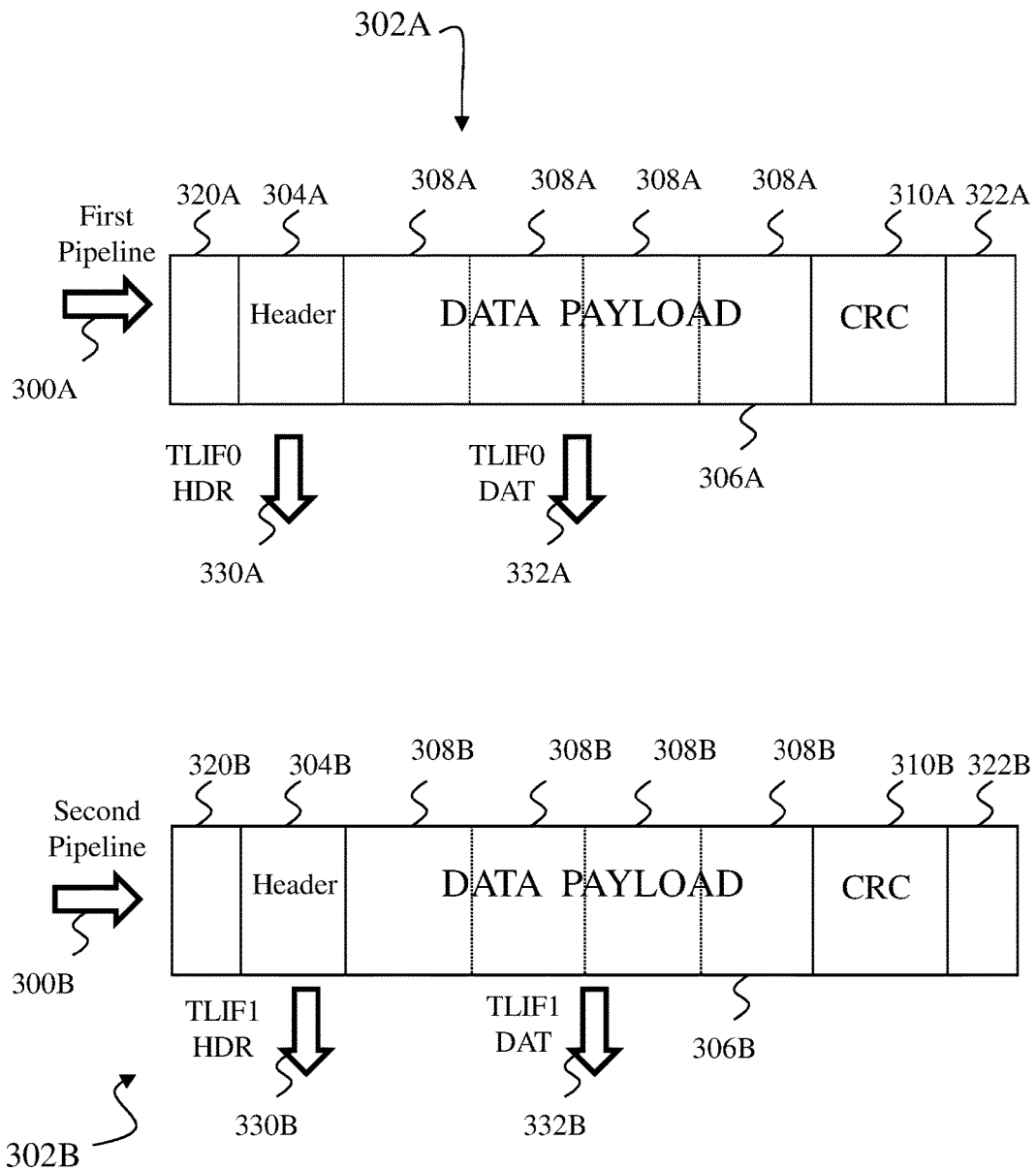
FIG. 3 illustrates a pair of packets received and processed in accordance with an embodiment.

FIG. 3 illustrates a pair of packets received and processed in accordance with an embodiment. A first packet 302A can be received on a first pipeline 300A, and a second packet 302B can be received on a second pipeline 300B in a same clock cycle or spread across multiple clock cycles. The first packet 302A can include a header portion 304A, a payload portion 306A, and cyclical redundancy check (CRC) portion 310A used for error detection and correction. The first packet 302A may also include framing symbols marking the beginning 320A and the end 322A of the first packet 302A. Similarly, the second packet 302B can include a header portion 304B, a payload portion 306B, and CRC portion 310B used for error detection and correction. The second packet 302B may also include framing symbols marking the beginning 320B and the end 322B of the second packet 302B.

Each of the payload portions 306A and 306B can be divided by multiple boundaries 308A and 308B respectively. Each boundary 308A, 308B can be a fixed distance from its nearest neighbor. In one embodiment, the distance between each boundary 308A, 308B is the width of the interface supplying the data.

Figure 4:
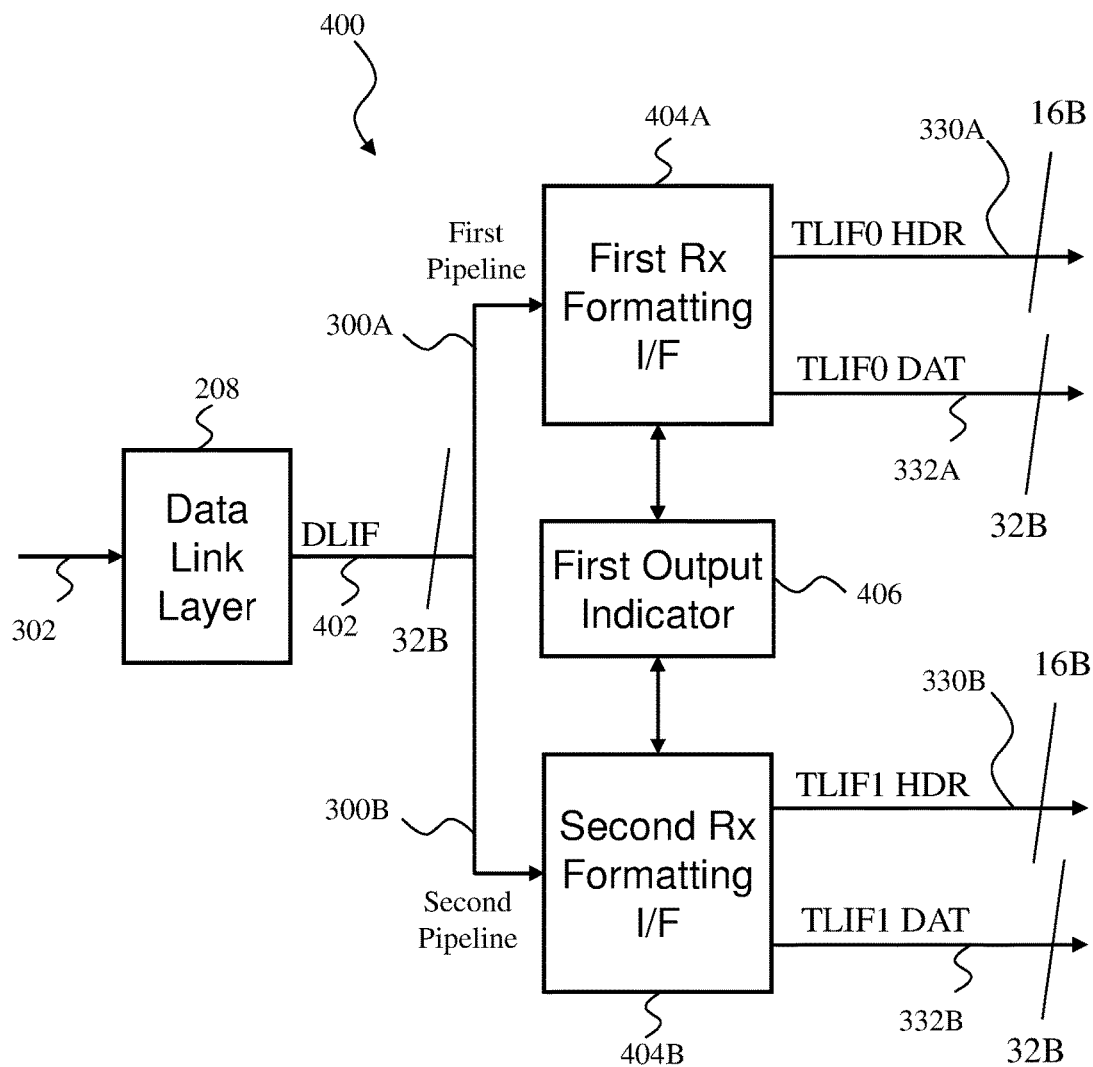
FIG. 4 illustrates transaction layer packet processing in accordance with an embodiment.

With reference to FIGS. 3 and 4, the header portion 304A of the first packet 302A can be routed through a first transaction layer header interface 330A for a downstream use. The header portion 304B of the second packet 302B can be routed through a second transaction layer header interface 330B for a downstream use. The first transaction layer header interface 330A and the second transaction layer header interface 330B may each be a 16 byte wide bus. The payload portion 306A of the first packet 302A can be routed through a first transaction layer data interface 332A for a downstream use. The payload portion 306B of the second packet 302B can be routed through a second transaction layer data interface 332B for a downstream use. The first transaction layer data interface 332A and the second transaction layer data interface 332B may each be a 32 byte wide bus. The downstream use may include further buffering in local memory of the computing device 102 of FIG. 1, for instance. The header portions 304A, 304B can provide processing and formatting information relative to the payload portions 306A, 306B.

Although FIG. 3 is described as a first packet 302A being received at a first pipeline 300A, the designation of "first" and "second" can change or alternate as packets 302 are received to maintain ordering rules. For instance, if a previous packet before the first packet 302A was processed on the first pipeline 300A, then the first packet 302A would be processed on the second pipeline 300B and the second packet 302B would be processed on the first pipeline 300A in a "ping-pong" alternating pattern to maintain order sequencing and flow control.

FIG. 4 illustrates transaction layer packet processing 400 in accordance with an embodiment. Control actions for the transaction layer packet processing 400 are described in reference to controller 110 of FIGS. 1 and 2; however, it will be understood that similar actions can be performed by the controller 114 of FIG. 1. A stream of packets 302 can be received at data link layer 208, for instance, after passing through the physical layer 206 of FIG. 2. A data link interface output 402 of the data link layer 208 can be provided to a first receiver formatting interface 404A of the first pipeline 300A and to a second receiver formatting interface 404B of the second pipeline 300B. A first output indicator 406 can be used to establish relative ordering of the packets 302 received at the data link layer 208 and processed by either the first receiver formatting interface 404A or the second receiver formatting interface 404B. For instance, when the first packet 302A of FIG. 3 is received, based on determining that the first receiver formatting interface 404A is selected by the first output indicator 406, the first receiver formatting interface 404A performs an alignment adjustment and output of the first packet 302A on the first transaction layer header interface 330A and the first transaction layer data interface 332A. Similarly, when the first packet 302A of FIG. 3 is received, based on determining that the second receiver formatting interface 404B is selected by the first output indicator 406, the second receiver formatting interface 404B performs an alignment adjustment and output of the first packet 302A on the second transaction layer header interface 330B and the second transaction layer data interface 332B. The controller 110 is operable to modify the state of the first output indicator 406 to alternate between selecting the first receiver formatting interface 404A and the second receiver formatting interface 404B to perform the alignment adjustment and output of the first packet 302A.

Further, when the second packet 302B is received at the data link layer 208, based on determining that the first receiver formatting interface 404A is not selected by the first output indicator 406, an alignment adjustment and output of the second packet 302B is performed by the first receiver formatting interface 404A rather than processing the first packet 302A. Similarly, when the second packet 302B is received at the data link layer 208, based on determining that the second receiver formatting interface 404B is not selected by the first output indicator 406, the alignment adjustment and output of the second packet 302B is performed by the second receiver formatting interface 404B rather than processing the first packet 302A. The state of the first output indicator 406 can be inverted, and the process continues as further packets 302 alternate between being designated as a first and second (i.e., not first). Further timing examples are depicted in FIG. 5 illustrating a sequence 500 of transaction layer packets distributed and reformatted for downstream use.

Figure 5:
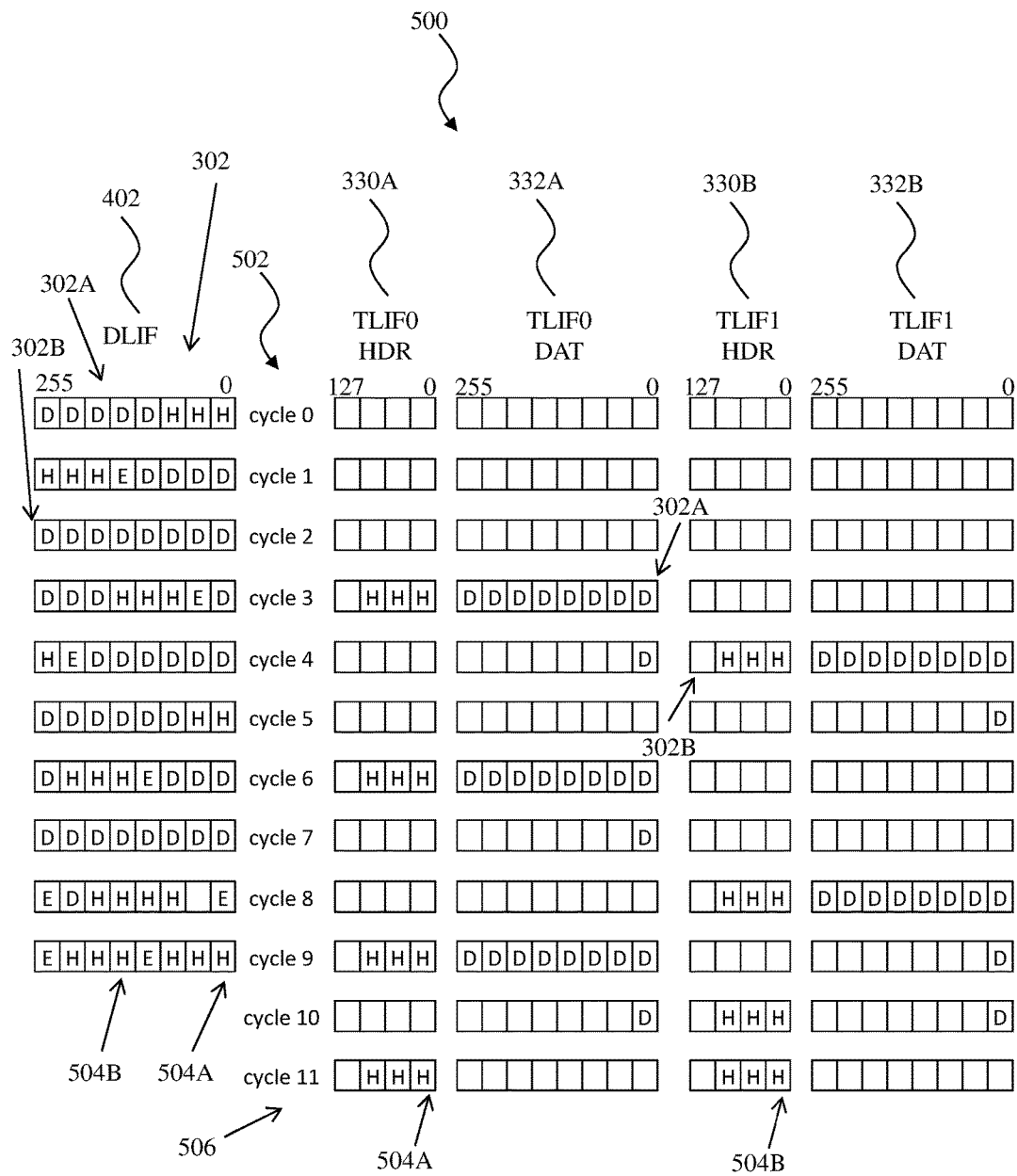
FIG. 5 illustrates a sequence of transaction layer packets distributed and reformatted for downstream use in accordance with an embodiment.

As can be seen in the example of FIG. 5 and with further reference to FIG. 4, there can be a delay of multiple cycles 502 between when packets 302 are received by data link layer 208 and are output by the first and second receiver formatting interfaces 404A, 404B. For instance, in cycle 9 of the sequence 500, two packets 504A, 504B (e.g., a first and second packet containing only headers) are passed from the data link interface output 402 to the first and second receiver formatting interfaces 404A, 404B, which are respectively aligned to the first and second transaction layer header interfaces 330A, 330B to output in parallel in a later clock cycle 506 (e.g., cycle 11). Packets 302 can be spread and partially received across multiple clock cycles. For instance, the first packet 302A can be passed from the data link interface output 402 in cycle 0 and cycle 1, while the second packet 302B can be passed from the data link interface output 402 in cycle 1, cycle 2, and cycle 3 (where "H" is a header value, "D" is a data value, and "E" is an end marker of a packet). The first receiver formatting interface 404A is selected by the first output indicator 406 to perform an alignment adjustment and output of the first packet 302A in cycles 3 and 4, and the second receiver formatting interface 404B performs the alignment adjustment and output of the second packet 302B in cycles 4 and 5. Since the number of data values exceeds the bus width, a first portion of the first packet 302A is output in one cycle (cycle 3) and a second portion of the first packet 302A is output in parallel with a first portion of the second packet 302B in a next cycle (cycle 4) by the first receiver formatting interface 404A and the second receiver formatting interface 404B. Wrapping of packet portions between cycles can be performed based on identifying an end marker (E) of a packet 302.

The controller 110 of FIG. 1 is operable to split output of header and data values on the first transaction layer header interface 330A and the first transaction layer data interface 332A from the first receiver formatting interface 404A and on the second transaction layer header interface 330B and the second transaction layer data interface 332B from the second receiver formatting interface 404B. The alignment adjustment of the first receiver formatting interface 404A can shift the header values (H) to align with a boundary (e.g., bit 0) of the first transaction layer header interface 330A and shift the data values (D) to align with a boundary (e.g., bit 0) of the first transaction layer data interface 332A. Similarly, the alignment adjustment of the second receiver formatting interface 404B can shift the header values (H) to align with a boundary (e.g., bit 0) of the second transaction layer header interface 330B and shift the data values (D) to align with a boundary (e.g., bit 0) of the second transaction layer data interface 332B. The alignment adjustment of the first receiver formatting interface 404A and the alignment adjustment of the second receiver formatting interface 404B can collapse gaps between the data values in some instances. For example, packing of data can be used to collapse gaps into lines to get a full line and write it.

Figure 6:
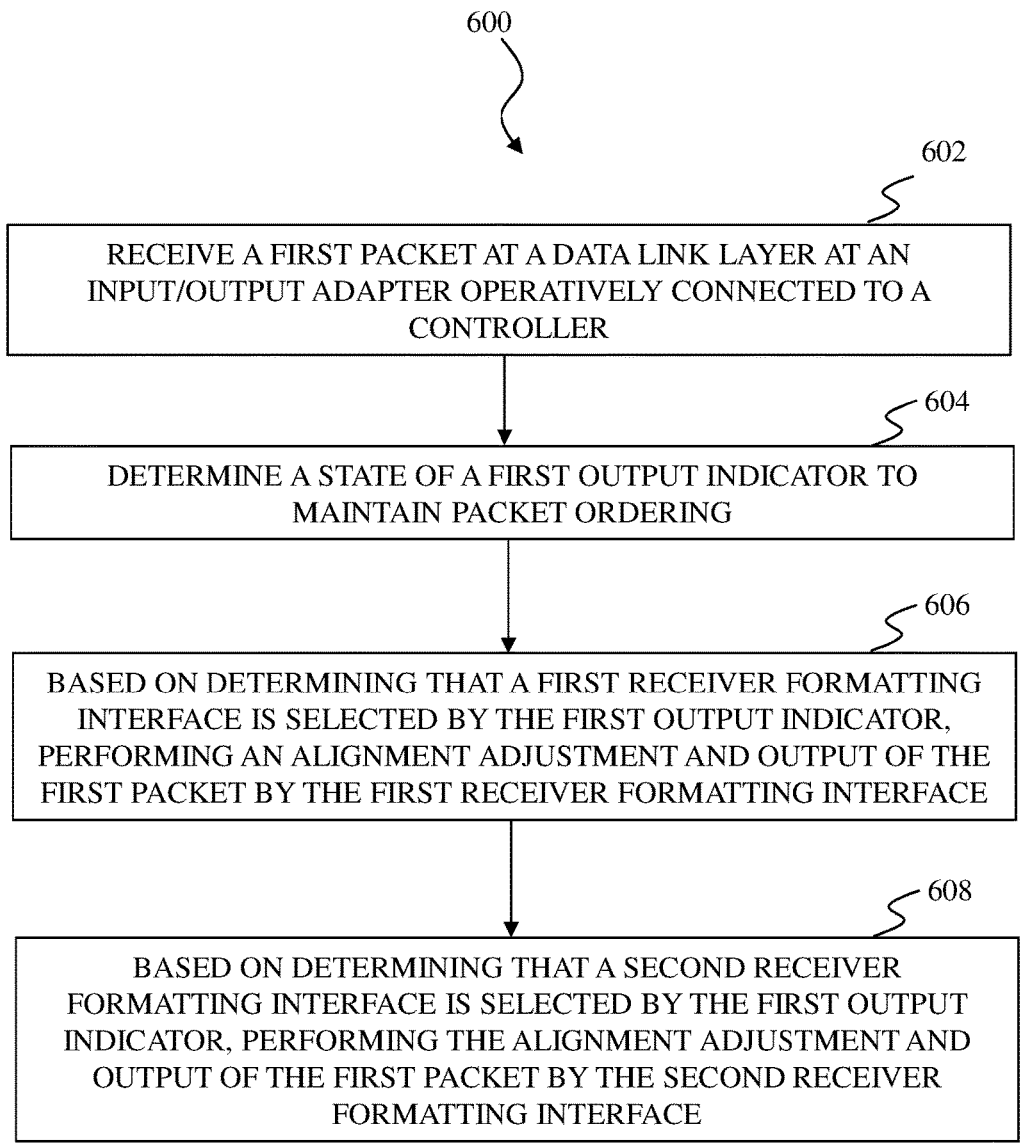
FIG. 6 illustrates a process flow in accordance with an embodiment.

Turning now to FIG. 6, a flow diagram of a process 600 is generally shown in accordance with an embodiment. The process 600 is described with reference to FIGS. 1-6 and may include additional steps beyond those depicted in FIG. 6. Although described in reference to controller 110, it will be understood that the process 600 can be performed by other controllers, such as controller 114.

At block 602, a first packet 302A is received at a data link layer 208 at an I/O adapter 108 operatively connected to a controller 110. The I/O adapter 108 can be a PCIe adapter. At block 604, the controller 110 determines a state of a first output indicator 406 to maintain packet ordering. At block 606, based on determining that a first receiver formatting interface 404A is selected by the first output indicator 406, the first receiver formatting interface 404A performs an alignment adjustment and output of the first packet 302A. At block 608, based on determining that a second receiver formatting interface 404B is selected by the first output indicator 406, the second receiver formatting interface 404B performs the alignment adjustment and output of the first packet 302A.

As previously described, the state of the first output indicator 406 can be modified to alternate between selecting the first receiver formatting interface 404A and the second receiver formatting interface 404B to perform the alignment adjustment and output of the first packet 302A. The interface not selected by the first output indicator 406 handles processing of the next packet (e.g., the second packet 302B). The process continues to "ping-pong" between the first receiver formatting interface 404A and the second receiver formatting interface 404B as additional packets 302 are received.

Figure 7:
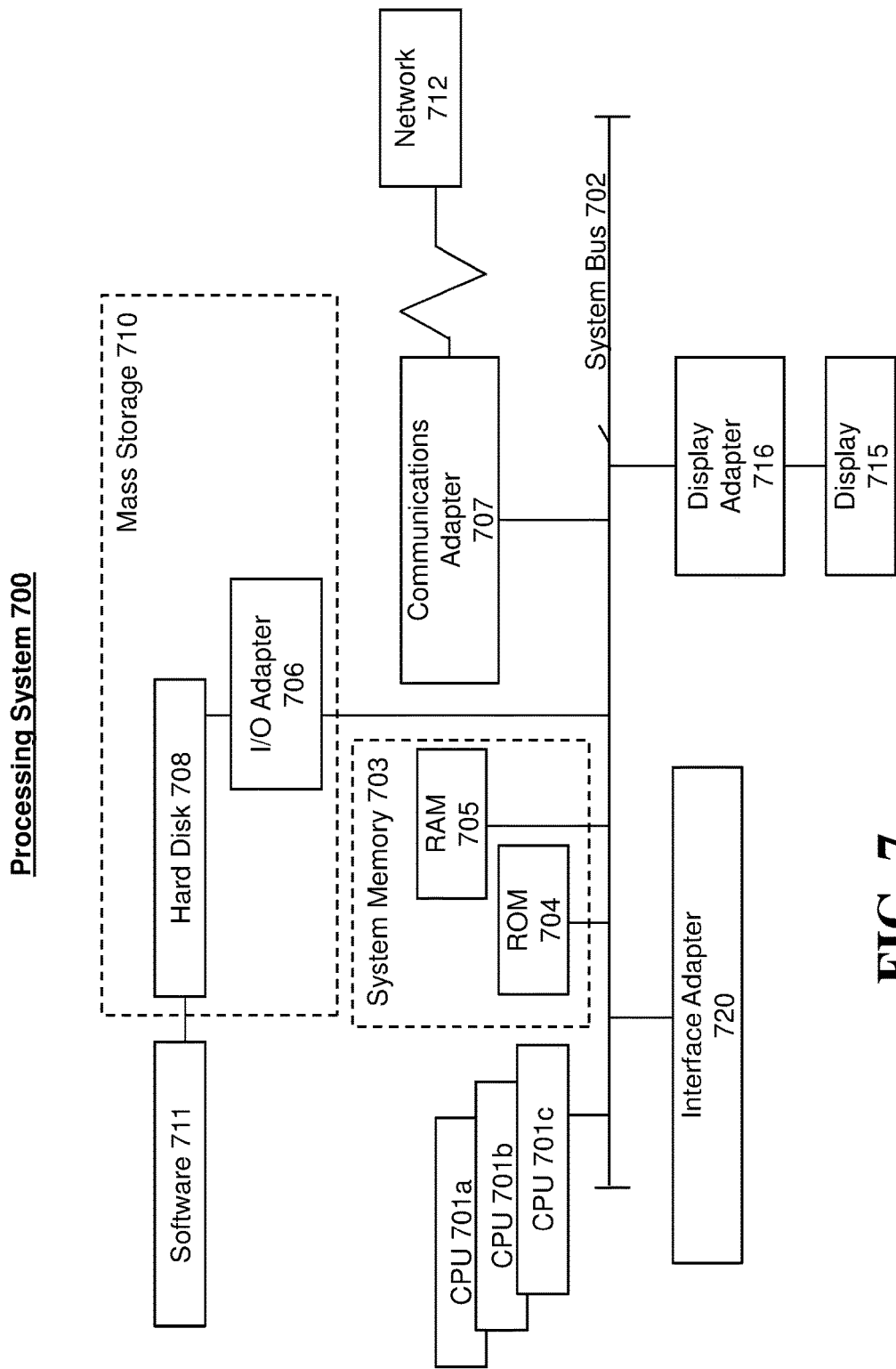
FIG. 7 illustrates a processing system in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701 can be an embodiment of the computing device 102 of FIG. 1. The processors 701, also referred to as processing circuits, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Alternatively, the I/O adapter 706 and/or the communications adapter 707 can be embodiments of the I/O adapter 108 or I/O adapter 112. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the process flow 600 of FIG. 6. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include protocols, such as PCIe. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

Technical effects and benefits include multi-packet processing while enforcing ordering rules in a computer system.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   an input/output adapter operable to receive a plurality of packets in a single clock cycle; and
   a controller operatively connected to the input/output adapter, the controller operable to perform:
   receiving a first packet at a data link layer;
   determining a state of a first output indicator to maintain packet ordering;
   based on determining that a first receiver formatting interface is selected by the first output indicator, performing an alignment adjustment and output of the first packet by the first receiver formatting interface;
   based on determining that a second receiver formatting interface is selected by the first output indicator, performing the alignment adjustment and output of the first packet by the second receiver formatting interface;
   receiving a second packet at the data link layer;
   based on determining that the first receiver formatting interface is not selected by the first output indicator, performing an alignment adjustment and output of the second packet by the first receiver formatting interface;
   based on determining that the second receiver formatting interface is not selected by the first output indicator, performing the alignment adjustment and output of the second packet by the second receiver formatting interface; and inverting the state of the first output indicator.

2. The system of claim 1, wherein the input/output adapter is a peripheral component interconnect express (PCIe) adapter.

3. The system of claim 1, wherein the controller is operable to modify the state of the first output indicator to alternate between selecting the first receiver formatting interface and the second receiver formatting interface to perform the alignment adjustment and output of the first packet.

4. The system of claim 1, wherein the first packet and the second packet are received in one clock cycle, and output of the first packet and the second packet by the first receiver formatting interface and the second receiver formatting interface is performed in parallel in a later clock cycle.

5. The system of claim 1, wherein a first portion of the first packet is output in one cycle and a second portion of the first packet is output in parallel with a first portion of the second packet in a next cycle by the first receiver formatting interface and the second receiver formatting interface, and wrapping of packet portions between cycles is performed based on identifying an end marker of a packet.

6. The system of claim 1, wherein the controller is operable to split output of header and data values on a first transaction layer header interface and a first transaction layer data interface from the first receiver formatting interface and on a second transaction layer header interface and a second transaction layer data interface from the second receiver formatting interface.

7. The system of claim 6, wherein the alignment adjustment of the first receiver formatting interface shifts the header values to align with a boundary of the first transaction layer header interface and shifts the data values to align with a boundary of the first transaction layer data interface, and the alignment adjustment of the second receiver formatting interface shifts the header values to align with a boundary of the second transaction layer header interface and shifts the data values to align with a boundary of the second transaction layer data interface.

8. The system of claim 6, wherein the alignment adjustment of the first receiver formatting interface and the alignment adjustment of the second receiver formatting interface are operable to collapse gaps between the data values.

9. A method comprising:
receiving a first packet at a data link layer at an input/output adapter operatively connected to a controller;
determining a state of a first output indicator to maintain packet ordering;
based on determining that a first receiver formatting interface is selected by the first output indicator, performing an alignment adjustment and output of the first packet by the first receiver formatting interface;
based on determining that a second receiver formatting interface is selected by the first output indicator, performing the alignment adjustment and output of the first packet by the second receiver formatting interface;
receiving a second packet at the data link layer;
based on determining that the first receiver formatting interface is not selected by the first output indicator, performing an alignment adjustment and output of the second packet by the first receiver formatting interface;
based on determining that the second receiver formatting interface is not selected by the first output indicator,
performing the alignment adjustment and output of the second packet by the second receiver formatting interface; and
inverting the state of the first output indicator.

10. The method of claim 9, wherein the input/output adapter is a peripheral component interconnect express (PCIe) adapter.

11. The method of claim 9, further comprising modifying the state of the first output indicator to alternate between selecting the first receiver formatting interface and the second receiver formatting interface to perform the alignment adjustment and output of the first packet.

12. The method of claim 9, wherein the first packet and the second packet are received in a first clock cycle, and output of the first packet and the second packet by the first receiver formatting interface and the second receiver formatting interface is performed in parallel in a second clock cycle.

13. The method of claim 9, wherein a first portion of the first packet is output in a first cycle and a second portion of the first packet is output in parallel with a first portion of the second packet in a second cycle by the first receiver formatting interface and the second receiver formatting interface, and wrapping of packet portions between cycles is performed based on identifying an end marker of a packet.

14. The method of claim 9, further comprising splitting output of header and data values on a first transaction layer header interface and a first transaction layer data interface from the first receiver formatting interface and on a second transaction layer header interface and a second transaction layer data interface from the second receiver formatting interface.

15. The method of claim 14, wherein the alignment adjustment of the first receiver formatting interface shifts the header values to align with a boundary of the first transaction layer header interface and shifts the data values to align with a boundary of the first transaction layer data interface, and the alignment adjustment of the second receiver formatting interface shifts the header values to align with a boundary of the second transaction layer header interface and shifts the data values to align with a boundary of the second transaction layer data interface.

16. The method of claim 14, wherein the alignment adjustment of the first receiver formatting interface and the alignment adjustment of the second receiver formatting interface are operable to collapse gaps between the data values.

17. A computer program product comprising a non-transitory computer readable storage medium having program instructions embodied therewith, the program instructions executable by a processing circuit of a controller to cause the processing circuit to perform:
receiving a first packet at a data link layer at an input/output adapter operatively connected to the controller;
determining a state of a first output indicator to maintain packet ordering;
based on determining that a first receiver formatting interface is selected by the first output indicator, performing an alignment adjustment and output of the first packet by the first receiver formatting interface;
based on determining that a second receiver formatting interface is selected by the first output indicator, performing the alignment adjustment and output of the first packet by the second receiver formatting interface;
receiving a second packet at the data link layer;
based on determining that the first receiver formatting interface is not selected by the first output indicator, performing an alignment adjustment and output of the second packet by the first receiver formatting interface;

based on determining that the second receiver formatting interface is not selected by the first output indicator, performing the alignment adjustment and output of the second packet by the second receiver formatting interface; and inverting the state of the first output indicator.

18. The computer program product of claim 17, wherein the program instructions further cause the processing circuit to perform:

modifying the state of the first output indicator to alternate between selecting the first receiver formatting interface and the second receiver formatting interface to perform the alignment adjustment and output of the first packet.

19. The computer program product of claim 17, wherein the first packet and the second packet are received in a first clock cycle, and output of the first packet and the second packet by the first receiver formatting interface and the second receiver formatting interface is performed in parallel in a second clock cycle.

20. The computer program product of claim 17, wherein a first portion of the first packet is output in a first cycle and a second portion of the first packet is output in parallel with a first portion of the second packet in a second cycle by the first receiver formatting interface and the second receiver formatting interface, and wrapping of packet portions between cycles is performed based on identifying an end marker of a packet.

* * * * *